US012559994B2

(12) United States Patent
Reddmann et al.

(10) Patent No.: US 12,559,994 B2
(45) Date of Patent: Feb. 24, 2026

(54) OPENING APPARATUS FOR A MOTOR VEHICLE DOOR ELEMENT

(71) Applicant: Kiekert AG, Heiligenhaus (DE)

(72) Inventors: Uwe Reddmann, Essen (DE); Holger Schiffer, Meerbusch (DE); Ömer Inan, Dorsten (DE); Christian Sturm, Krefeld (DE); Peter Szegeny, Engelskirchen (DE)

(73) Assignee: Kiekert AG, Heiligenhaus (DE)

( * ) Notice: Subject to any disclaimer, the term of this patent is extended or adjusted under 35 U.S.C. 154(b) by 199 days.

(21) Appl. No.: 18/042,521

(22) PCT Filed: Jul. 13, 2021

(86) PCT No.: PCT/DE2021/100614
§ 371 (c)(1),
(2) Date: Feb. 22, 2023

(87) PCT Pub. No.: WO2022/057967
PCT Pub. Date: Mar. 24, 2022

(65) Prior Publication Data

US 2023/0332442 A1 Oct. 19, 2023

(30) Foreign Application Priority Data

Sep. 17, 2020 (DE) ..................... 10 2020 124 240.9

(51) Int. Cl.
*E05B 81/14* (2014.01)
*E05B 81/16* (2014.01)
*E05B 81/90* (2014.01)

(52) U.S. Cl.
CPC .............. *E05B 81/14* (2013.01); *E05B 81/16* (2013.01); *E05B 81/90* (2013.01)

(58) Field of Classification Search
CPC .......... E05B 81/14; E05B 81/90; E05B 81/16; E05B 81/20; E05B 17/0062; E05B 17/02;
(Continued)

(56) References Cited

U.S. PATENT DOCUMENTS 5,411,302 A * 5/1995 Shimada ................. E05B 81/20
292/201
8,646,816 B2 * 2/2014 Dziurdzia ........... E05B 17/0029
292/216

(Continued)

FOREIGN PATENT DOCUMENTS

CA 2183618 A1 * 2/1998 ............. E05B 77/28
CA 2279472 A1 * 9/2000 ............. E05B 83/36
(Continued)

OTHER PUBLICATIONS

WO2011120482A1 Espacenet machine translation description and claims (Year: 2024).*

(Continued)

*Primary Examiner* — Steven A Tullia
(74) *Attorney, Agent, or Firm* — Renner, Otto, Boisselle & Sklar, LLP

(57) ABSTRACT

A motor vehicle lock having a locking mechanism with a rotary latch and at least one pawl, wherein a rotary movement of the rotary latch can be locked by means of the pawl, an electric drive device with which the pawl can be transferred from a locking position into a release position for the locking mechanism, and an opening device, wherein a vehicle part interacting with the motor vehicle lock can be moved by means of the opening device from a closed position into an open position, and wherein a safety means is provided, wherein the safety means makes it possible to hold the vehicle part in the event of a power failure.

12 Claims, 1 Drawing Sheet

(58) Field of Classification Search
CPC .......... E05B 77/12; E05B 77/04; E05B 85/24; E05B 85/247; E05B 85/245; Y10T 292/1082; Y10S 292/14
See application file for complete search history.

(56) References Cited

U.S. PATENT DOCUMENTS

| | | | | |
|---|---|---|---|---|
| 8,757,682 | B2 * | 6/2014 | Scholz | E05B 81/20 292/216 |
| 9,145,716 | B2 * | 9/2015 | Jayasuriya | E05B 77/08 |
| 9,340,179 | B2 * | 5/2016 | Kim | E05B 77/08 |
| 10,060,164 | B2 * | 8/2018 | Rao | E05B 83/243 |
| 10,329,811 | B2 * | 6/2019 | Cho | B60R 21/38 |
| 10,717,407 | B2 * | 7/2020 | Szente | E05B 51/023 |
| 10,941,592 | B2 * | 3/2021 | Taurasi | E05B 77/08 |
| 11,072,950 | B2 * | 7/2021 | Taurasi | E05B 77/245 |
| 11,105,126 | B2 * | 8/2021 | Ogawase | E05B 77/36 |
| 11,220,848 | B2 * | 1/2022 | Chevalier | E05B 83/24 |
| 11,414,904 | B2 * | 8/2022 | Klein | E05B 85/245 |
| 11,428,032 | B2 * | 8/2022 | Sturm | E05B 83/24 |
| 11,572,721 | B2 * | 2/2023 | Strole | E05C 3/12 |
| 11,781,349 | B2 * | 10/2023 | Klein | E05B 83/24 180/274 |
| 12,054,973 | B2 * | 8/2024 | Holbein | E05B 83/24 |
| 2012/0292927 | A1 * | 11/2012 | Vazquez | B23P 11/00 292/200 |
| 2013/0238187 | A1 * | 9/2013 | Zysk | E05B 81/56 701/36 |
| 2014/0088826 | A1 * | 3/2014 | Wheeler | E05B 83/24 701/36 |
| 2018/0142504 | A1 * | 5/2018 | Hwang | E05B 83/243 |
| 2018/0179788 | A1 | 6/2018 | Oxley et al. | |
| 2018/0230718 | A1 * | 8/2018 | Menke | E05B 15/022 |
| 2020/0232263 | A1 | 7/2020 | Strole et al. | |
| 2022/0228404 | A1 * | 7/2022 | Klein | E05B 77/08 |
| 2022/0364397 | A1 * | 11/2022 | Drost | E05B 83/26 |

FOREIGN PATENT DOCUMENTS

| | | | | |
|---|---|---|---|---|
| CA | 2489465 | C * | 6/2011 | E05B 77/34 |
| DE | 19619868 | A1 * | 11/1997 | E05B 15/04 |
| DE | 19804066 | A1 * | 8/1998 | E05B 83/16 |
| DE | 102009046880 | A1 * | 5/2011 | E05B 77/04 |
| DE | 102010025355 | A1 * | 12/2011 | E05B 83/24 |
| DE | 102011015669 | A1 | 10/2012 | |
| DE | 102012020998 | A1 * | 2/2014 | E05B 77/32 |
| DE | 102015003918 | A1 | 9/2016 | |
| DE | 102016210596 | A1 * | 12/2016 | E05B 77/08 |
| DE | 102017001559 | A1 * | 8/2017 | E05B 83/24 |
| DE | 102016105760 | A1 | 10/2017 | |
| DE | 202016104563 | U1 | 11/2017 | |
| DE | 102017108265 | A1 * | 10/2018 | E05B 81/14 |
| DE | 102017124282 | A1 | 4/2019 | |
| DE | 102018101574 | A1 * | 7/2019 | E05B 81/64 |
| DE | 102018101575 | A1 * | 7/2019 | E05B 77/04 |
| DE | 102018114663 | A1 * | 12/2019 | E05B 81/14 |
| DE | 102020101665 | A1 | 7/2020 | |
| DE | 102020214201 | A1 * | 6/2021 | E05B 77/00 |
| DE | 102017206667 | B4 * | 4/2024 | E05B 15/04 |
| JP | 2558305 | Y2 * | 12/1997 | E05B 65/19 |
| JP | 6789725 | B2 * | 11/2020 | E05B 83/24 |
| KR | 19980049836 | A * | 9/1998 | B62D 25/12 |
| KR | 20040049053 | A * | 6/2004 | B62D 25/12 |
| KR | 100482685 | B1 * | 4/2005 | B62D 25/12 |
| KR | 20100025114 | A * | 3/2010 | E05B 85/20 |
| KR | 100984959 | B1 * | 10/2010 | E05B 83/24 |
| KR | 20110096304 | A * | 8/2011 | E05B 77/08 |
| KR | 20170020597 | A * | 2/2017 | E05B 83/22 |
| KR | 101798204 | B1 * | 11/2017 | E05B 83/24 |
| WO | WO-2004101925 | A1 * | 11/2004 | E05B 81/14 |
| WO | WO-2011120482 | A1 * | 10/2011 | E05B 77/38 |
| WO | WO-2012100328 | A1 * | 8/2012 | E05B 77/08 |
| WO | 2017025081 | A1 | 2/2017 | |
| WO | 2017174980 | A2 | 10/2017 | |
| WO | WO-2019130605 | A1 * | 7/2019 | B62D 25/12 |

OTHER PUBLICATIONS

International Search Report mailed Nov. 2, 2021, for priority International Patent Application No. PCT/DE2021/100614.

* cited by examiner

OPENING APPARATUS FOR A MOTOR VEHICLE DOOR ELEMENT

This application is a national phase of International Patent Application No. PCT/DE2021/100614 filed Jul. 13, 2021, which claims priority to German Patent Application No. 10 2020 124 240.9 filed Sep. 17, 2020, each of which is hereby incorporated herein by reference in its entirety.

FIELD OF DISCLOSURE

The invention relates to a motor vehicle lock having a locking mechanism with a rotary latch and at least one pawl, wherein a rotary movement of the rotary latch can be locked by means of the pawl, an electric drive device with which the pawl can be transferred from a locking position into a release position for the locking mechanism, and an opening device, wherein a vehicle part interacting with the motor vehicle lock can be moved by means of the opening device from a closed position into an open position.

BACKGROUND OF DISCLOSURE

Today's motor vehicles are increasingly being provided with convenience functions. For example, in order to make it easier to get into a motor vehicle and to be able to influence the aesthetic and aerodynamic shape, motor vehicles are equipped, for example, without an outer door handle. It is also conceivable, however, that an outside door handle be provided, but this only forwards a switching signal to the motor vehicle door latch to open it. In order to facilitate and automate getting into vehicles and, for example, to allow for getting into vehicles without handles on the outside of the door, so-called opening devices or door openers, some of which are also referred to as opening apparatuses, are used.

DE 10 2011 015 669 A1 describes an opening device for motor vehicle doors or hatches by means of which a door, hatch, or hood can be transferred from a closed position to an open position. If the opening device relates, for example, to a motor vehicle side door, the door can be opened by means of an electrical pulse. For this, the locking mechanism of the door latch must first be unlocked-preferably electrically-so that the door can be opened. If, for example, the door sealing pressure is not sufficient to move the door from the closed position into an open position, the door can be moved into an open position by means of the opening device. An open position is defined here in such a way that the operator of the motor vehicle is able to grasp the door so that they can fully open the door. The opening device used here is an electric drive that acts mechanically on the motor vehicle door via a drive pawl and an inner and outer lever in the form of a pivoting movement of the levers.

DE 10 2016 105 760 A1 discloses an opening apparatus for a motor vehicle door with a base plate, furthermore with a drive element mounted on the base plate, and a drive unit, wherein a first sensor assigned to the drive element is provided which distinguishes at least between an opening process and a manual opening process. The opening apparatus comprises a drive which can be driven via a sensor and a control unit. A flexible connecting means then makes it possible to pivot a transmission lever, which in turn allows an opening movement via a drive lever and a drive slide. In order to allow for the door to be moved, the drive slide moves linearly and, for example, out of an opening in a body so that an unlatched and unlocked door can be opened at least in some regions. The end position of the drive slide can be detected by means of a second stationary sensor so that the drive can be switched off again.

From DE 10 2017 124 282 A1, an opening apparatus for a motor vehicle door element has become known, having an electric drive and an actuating means, wherein the actuating means can be adjusted by means of the drive and a transmission arranged between the actuating means and the drive. The door can be moved by means of the opening apparatus, wherein a sliding element is arranged on the actuating means and interacts with a switching means so that the door movement can be detected. The actuating means is substantially formed from a driven toothed rack having an integrated sliding element, switching means, and electrical supply line. It is possible to control the movement of the driven toothed rack by means of the switching means between the sliding element and the body.

The known opening devices have proven themselves in principle, but reach their limits when there is an unintentional power failure or drop in current in a motor vehicle. If, for example, the available electrical voltage in the on-board electrical system fails due to an accident, it must be ensured that the side door, for example, can be opened. In principle, the invention relates to motor vehicle locks that are to be electrically unlocked, wherein a side door can be equipped, for example, without an external door handle, or the existing outer door handle no longer has a mechanical connection to the motor vehicle lock. If, for example, the current in the motor vehicle falls, or the power fails due to an accident, it must also be able to be ensured in this case that the door can be opened. This is where the invention comes in.

SUMMARY OF DISCLOSURE

The object of the invention is to provide an improved opening device for a vehicle part arranged movably on the motor vehicle. In addition, it is an object of the invention to provide an opening device which, even in the event of a drop in current, enables the movable vehicle part to be opened, wherein, for safety reasons, complete and independent opening has to be prevented. Finally, the object of the invention is that of providing a structurally simple and inexpensive solution.

The object is achieved by the features of independent claim 1. Advantageous forms of the invention are indicated in the subclaims. It should be noted that the exemplary embodiments described below are not restrictive; rather, any variation of the characteristics described in the description and subclaims is possible.

According to claim 1, the object of the invention is achieved in that a motor vehicle lock is provided having a locking mechanism with a rotary latch and at least one pawl, wherein a rotary movement of the rotary latch can be locked by means of the pawl, an electric drive device with which the pawl can be transferred from a locking position into a release position for the locking mechanism, and an opening device, wherein a vehicle part interacting with the motor vehicle lock can be moved by means of the opening device from a closed position into an open position, and wherein a safety means is provided, wherein the safety means makes it possible to hold the vehicle part in the event of a power failure. As a result of the design of the motor vehicle lock according to the invention, it is now possible to prevent unintentional opening of the movable vehicle part even in an emergency—namely when, due to a drop in current, a sufficient energy supply is no longer available for enabling proper electrical opening of the locking system and subsequent opening. In this case, the safety means is used and holds the vehicle part arranged movably on the motor vehicle in the open position. In this case, the safety means is able to secure the vehicle part, even in the event of an accident, in such a way that automatic opening of the vehicle part does not take place. In other words, the movable vehicle part is securely held in the open position.

An open position is defined in that the operator can grip and open the vehicle part completely in a conventional manner. Only in the event of a power failure or drop is the vehicle part opened and held in a positionally-fixed manner by means of the safety means. In the event that the safety means engages, complete opening is no longer possible. In this case, the movable motor vehicle part, which can, for example, be a door, a hatch, an engine hood, a sliding door, or, for example, also a glove compartment, is fixed and held in the open position by the safety means.

The invention relates to a motor vehicle lock, wherein not just a motor vehicle door lock is claimed here, but, rather, locks may also be meant, which, as hood locks, tailgate locks, sliding door locks, tank locks, or hatch locks, as well as all those motor vehicle parts, which have an automatic opening device and are to be protected against complete opening. The invention preferably relates to motor vehicle door locks with a locking mechanism, having a rotary latch and at least one pawl.

The rotary latch is preferably rotatably accommodated in the motor vehicle lock and interacts with a lock strike or lock bracket. If the interaction between the lock strike and the rotary latch causes, for example, a rotary movement of the rotary latch in the closing direction, the pawl interacts with the rotary latch in a spring-loaded manner, for example, so that the rotary latch is fixed or held in its closed position. The pawl blocks the rotary movement of the rotary latch.

A preferably electrically-actuated drive device acts on the pawl and can transfer the pawl from its locking position into a release position so that the rotary latch becomes free and opens the locking mechanism. Such motor vehicle locks are also referred to as electrical locks or E-locks, and the process of unlocking is referred to as electrical opening. In particular in the case of E-locks in which the locking mechanism is electrically released, for example, a door sealing pressure can serve, for example, to transfer the motor vehicle part from a closed position into an open position. If, for example, the door sealing pressure is not sufficient to move the motor vehicle door from the closed position into an open position so that an operator can grasp and completely open the door, the opening device serves to transfer the motor vehicle door into an open position.

In a further development of the invention, the safety means can be latched into a lock strike. The interaction between safety means and lock strike makes it possible here to provide a safety system for the motor vehicle with a minimum number of components. Starting from the motor vehicle lock, the safety means engages the lock strike and can thus safely hold the open position of the movable component—in particular, a side door. The motor vehicle lock is usually arranged in the vehicle door element and cooperates with a lock strike fastened to the motor vehicle body. If the safety means is now used structurally in such a way that the safety means acts directly on the lock strike, a structurally and economically beneficial solution for realizing a safety means can be provided.

If the safety means can be brought into engagement with the lock strike in a spring-loaded manner, a further advantageous embodiment can be achieved. A spring preload of the safety means ensures, even in the event of a power failure, that the safety means can be reliably adjusted into the safety position. Thus, the safety means need only be released in order to achieve the safety position, which, in the case of a drop in current or power failure, can be facilitated with the lowest possible energy consumption. A spring preload can be achieved, for example, from a spring element, and in particular a leg spring encircling the safety means, wherein the spring element preloads the safety means into the safety position. In the non-actuated state, the safety means is then present in the motor vehicle lock in such a way that, in the event of a power failure or drop in current, the safety means has only to be released in order to bring the safety means into engagement with the lock strike.

If the safety means is designed as a blocking lever, and in particular designed as a pivotably-mounted blocking lever, an advantageous embodiment variant of the invention can again be achieved. The design of the safety means as a blocking lever offers a structurally favorable possibility for realizing a movement of the safety means in the motor vehicle lock. A pivotable or rotatable bearing of the blocking lever is to be realized in a simple manner in the motor vehicle lock and, conditionally, requires only a smallest possible number of components in order to enable the movement of the blocking lever. An introduction of a spring force into a pivotably-mounted lever is also, for example, easily realizable by means of a spiral spring.

It has been found to be particularly advantageous to pivotably accommodate the blocking lever on a locking mechanism partial axis, and in particular on the rotary latch axis. The accommodation of the blocking lever or safety means on a locking mechanism partial axis reduces the number of components required to a minimum. At the same time, the blocking lever can be mounted in the vicinity of the lock strike, which simplifies the engagement in the lock strike. When a side door, for example, is being closed, the rotary latch is brought into engagement with the lock strike and, due to the interaction between the lock strike and the rotary latch, moves into the latching position in which the rotary latch can achieve the pre-latching and/or main latching position by means of the pawl. If the motor vehicle lock is now in a main latching position, the side door, for example, is in its closed position. If there is now a drop in current in the closed position, the safety means or the blocking lever can be released and transferred into a safety position. Parallel thereto or immediately thereafter, the electrically-releasable locking mechanism can be unlocked, as a result of which the motor vehicle door moves into an open position. By means of the deployment device, for example, the deployment device can then bring the door into the open position via a residual current. In the open position, the door element is then held by means of the blocking lever. The door can then no longer be opened completely. This securing of the door element is necessary in particular in the event of an accident, since an occupant is prevented from being hurled out of the vehicle. However, the door is in an open position, so that means for completely opening the door element can be provided or can be introduced. The electrical motor vehicle lock was opened by means of the available residual energy, so that the vehicle driver or a helper is able to completely open the door element.

The position of the blocking lever on a locking mechanism axis makes it possible to pivotably mount the blocking lever in the immediate vicinity of the lock strike. The blocking lever is preferably mounted on the rotary latch axis, but mounting on the locking mechanism axis is also possible. In this case, the blocking lever can engage in a form-fitting manner around the lock strike, at least in regions. A form fit between the blocking lever and the lock strike enables a structurally simple and advantageous option for realizing secure holding of the movable vehicle part. A form fit can be produced, for example, in that the blocking lever is hook-shaped and encompasses the lock strike, at least in regions, in the engagement position. The encompassing of the lock strike thereby enables secure holding of the movable vehicle part, wherein the securing can be increased by, for example, the spring element. However, it is also conceivable that the form fit between the blocking lever and the lock strike be designed such that the blocking lever latches in the lock strike. In this case, the spring force and/or the drive for the blocking element is designed such that a latching of the blocking lever in the lock strike can be facilitated. In an advantageous manner, it is also conceivable for the blocking lever to be equipped, for example, at least in regions, with a plastic cover so that a latching or clipping of the blocking lever into the lock strike can be facilitated. The blocking lever is preferably produced from a steel material, so that large forces, such as those that occur, for example, in the event of an accident, can also be absorbed. In any case, the safety means must prevent a user of the motor vehicle from being hurled out through a fully open door in the event of an accident, for example. After engagement in the lock holder, the safety means holds the movable component such that at least an engagement in the safety means is necessary in order to transfer the safety means from the engagement position into a release position.

If the blocking lever can be released from the engagement with the lock strike by means of an internal door handle, an embodiment variant of the invention results. It is conceivable that the blocking lever as a safety means be able to be moved out of the engagement position by means of the inner door handle. If, for example, a power failure is detected in the motor vehicle, the electrical side door lock is unlocked from a certain current threshold so that the operator is able to leave the vehicle. In this case, however, it must be ensured that the door element does not open independently and fully, so that an accident or damage to the door element can be prevented. If a mechanical connection now exists between the blocking lever and the inner door handle, the operator is able to transfer the safety means from the engagement position into the release position. Typically, an inner door handle in a fully electronic lock is no longer mechanically connected to the side door lock, wherein an opening of the locking mechanism or an unlocking of the locking mechanism is initiated by means of a control signal, and electrically initialized. According to the invention, the blocking lever can be moved out of the engagement position into the release position via the inner door handle.

Alternatively, it is conceivable that the blocking lever have a predetermined breaking point. A predetermined breaking point allows the operator to open the vehicle by force in the event of an emergency. In this case, the predetermined breaking point must be designed such that, in the event of an accident, the door can be held; however, with increased force, the blocking lever can be released from engagement with the lock strike. Via the predetermined breaking point, a helper, such as for example the fire department, can then break open the blocking lever at the predetermined breaking point—for example, in an emergency.

However, it is also conceivable that the blocking lever be able to be released from engagement with the lock strike by means of an additional release lever. Such a release lever can be formed, for example, on the blocking lever and, in the event of the blocking lever being transferred, can be positioned in the engagement position in such a way that the release lever can be gripped by the user of the motor vehicle. In such a case, it is easily possible for the operator to move the blocking lever out of engagement with the lock strike. The moving of the blocking lever into the engagement position then pivots and/or shifts the release lever into a position in which the release lever can be gripped and moved by the user of the motor vehicle.

In a further embodiment variant of the invention, the blocking lever can be released by means of a latching force being exceeded—in particular, a latching force which can be introduced into the blocking lever by means of a spring element. The spring element holds the blocking lever in engagement with the lock strike. In an advantageous manner, the spring force is designed such that, in the event of an accident, and in particular a first impact on the motor vehicle, the blocking lever remains in its engagement position. If a vehicle driver now has to be rescued from the motor vehicle, it is possible to release the blocking lever from engagement with the lock strike with excessive force that far exceeds a conventional opening force. The blocking lever is then released against the latching force from the engagement with the lock strike.

The design of the motor vehicle lock according to the invention now makes it possible to provide a safety means by means of which an electrically actuatable locking system can be opened, even in the event of an accident and/or a drop in current, wherein, at the same time, a positioning of the movable vehicle part into a complete opening position can be prevented. In this case, the safety means makes it possible to protect the vehicle occupants and at the same time provides means to manually transfer the safety means into a release position.

BRIEF DESCRIPTION OF DRAWINGS

The invention is explained in more detail below with reference to the attached drawings on the basis of a preferred exemplary embodiment. However, the principle applies that the exemplary embodiment does not limit the invention, but merely represents an advantageous embodiment. The features shown can be implemented individually or in combination with further features of the description as well as the claims-individually or in combination.

In the drawings.

DETAILED DESCRIPTION

Figure 1:
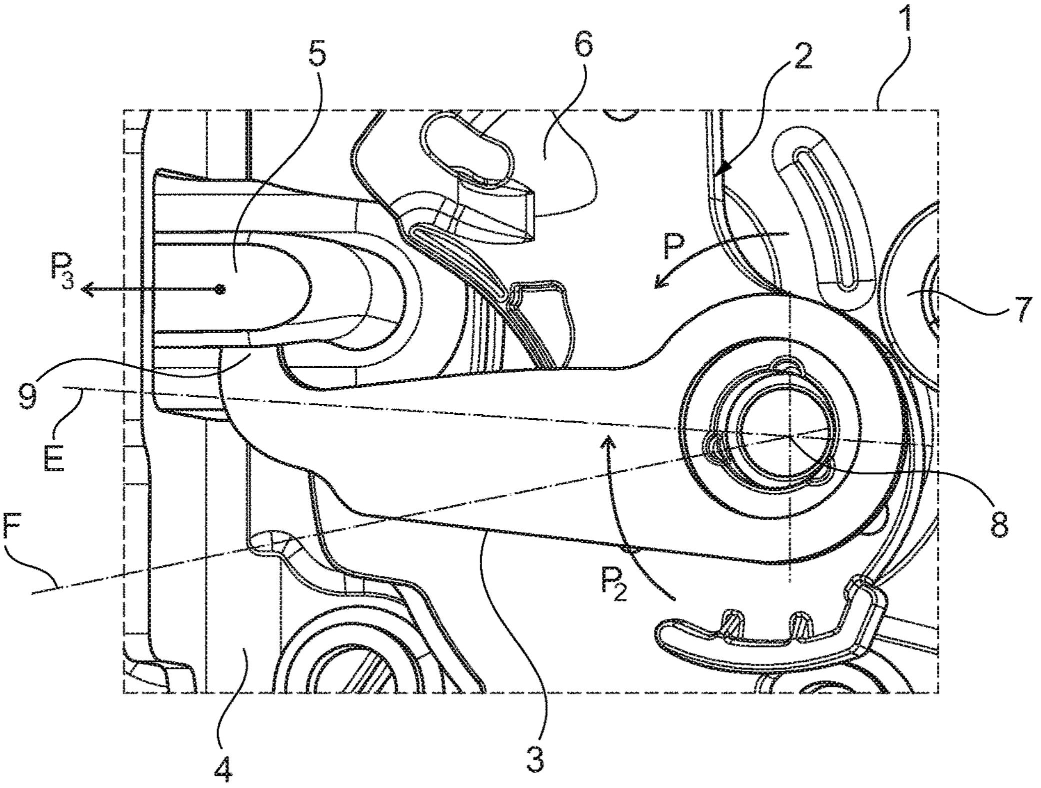
FIG. 1 shows a detail view of a motor vehicle lock in the region of a locking mechanism and a lock strike, wherein a side view of a rotary latch is shown, and the rotary latch is shown in an open position.

FIG. 1 shows a side view of a motor vehicle lock 1 shown only in part in a side view of a locking mechanism 2, a blocking lever 3, a lock case 4, and a lock strike 5. The locking mechanism 2 can be seen, wherein only the rotary latch 6 is shown. A rotary latch buffer 7 interacts with the rotary latch 6, viz., when the rotary latch 6, for latching, moves in the clockwise direction about the axis 8. During the movement of the rotary latch 6, the rotary latch 6 comes into engagement with the rotary latch buffer so that a controlled latching and in particular a low-noise latching of the locking mechanism 2 can be facilitated. The rotary latch axis (not shown) pivots about the axis 8, wherein the rotary latch axis is fixedly received in the lock case 4.

The position of the rotary latch 6 is shown after an electrical opening, i.e., the locking mechanism 2 has been electrically unlocked, so that the rotary latch 6 achieves an open position in the direction of the arrow P, as shown in FIG. 1. Before the locking mechanism 2 is unlocked, the blocking lever is pivoted in an electrically-driven and/or spring-driven manner into its engagement position. FIG. 1 shows the engagement position E in which the blocking lever is in engagement with the lock strike 5. In order to latch the blocking lever 3, the blocking lever 3 has a hook-shaped end 9, wherein the hook-shaped end 9 facilitates a form-fitting connection between the lock strike 6 and the blocking lever 3.

Starting from a release position F of the blocking lever 3, the blocking lever 3 can be actuated, for example, by means of the electric drive to unlock the locking mechanism. It is, for example, conceivable that the electric drive be driven in an opposite direction to the unlocking, so that the blocking lever can be actuated or released. The blocking lever 3 can thus be brought electromechanically into the engagement position and/or released, so that the blocking lever 3 can be moved in a spring-loaded manner into the engagement position. Of course, a combination of driven and spring-assisted movement of the blocking lever is also conceivable according to the invention. After the blocking lever 3 has been moved into the engagement position E, the unlocking process for the locking mechanism 2, for example, can now be initiated. The available energy can thus be used to facilitate an opening of the handle-less door. The motor vehicle lock 1 is unlocked or opened, and the door is opened; however, the blocking lever 3, which is spring-biased, for example, is activated beforehand, as a result of which the door opening is reduced to a gap which is sufficient for reaching through the gap with fingers, for example. The door can thus be prevented from swinging open. The door thus achieves an open position, wherein the door is prevented from opening fully by the blocking lever 3.

Figure 2:
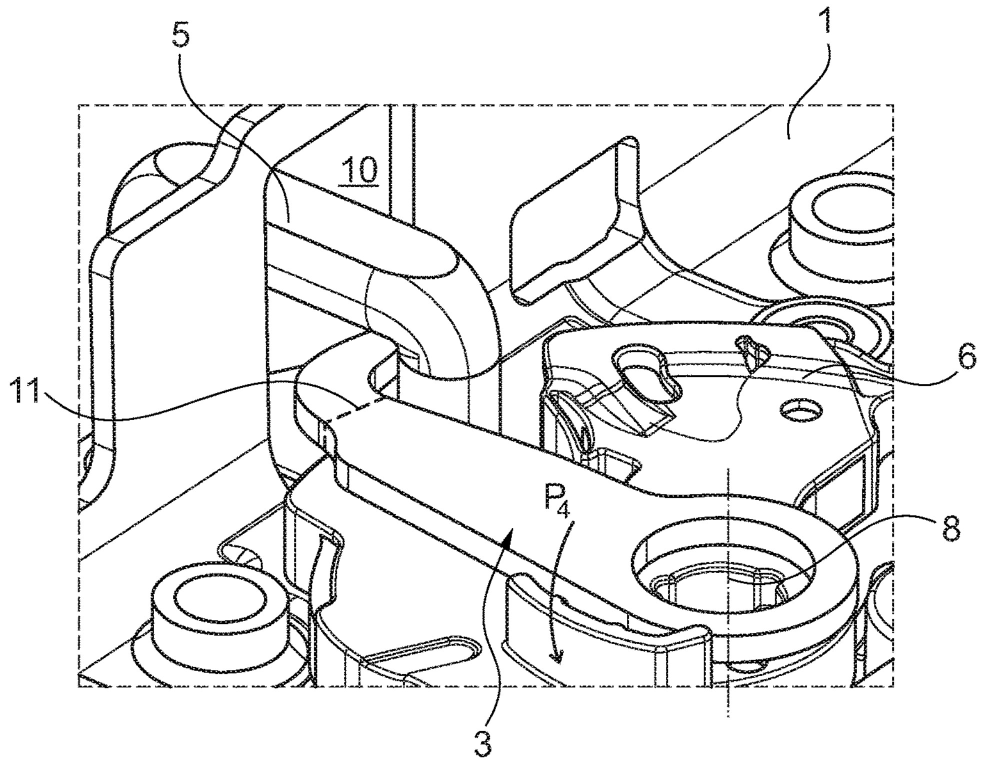
FIG. 2 shows a three-dimensional view of the rotary latch with a blocking lever, wherein the interaction between the blocking lever and the lock strike is shown in relation to the position between the lock strike and the motor vehicle lock.

FIG. 2 shows a three-dimensional view of the vehicle lock 1. It can be clearly seen that the lock strike 5 is designed as a lock strike bracket. The lock strike bracket is designed in such a way that both the rotary latch 6 and the blocking lever 3 can engage with the lock strike 5. In this embodiment, the lock strike 5 projects through an opening 10, but has not yet left the motor vehicle lock 1. The motor vehicle lock is usually installed in a motor vehicle door or hatch, for example, whereas the lock strike 5 is mounted on the body. The locking mechanism 2 is in an open position so that the lock strike 5 can be freely moved with respect to the locking mechanism 2. The blocking lever 3 prevents the lock strike from moving out of the engagement region of the motor vehicle lock 1. To completely open the door, for example, the blocking lever 3 must now be moved out of the engagement region with the lock strike. For this purpose, the blocking lever 3 can have a predetermined breaking point 11, for example, which releases the lock strike 5 in the event of excessive force. However, it is also conceivable that, for example, a mechanical connection to the inner door handle exist, so that the blocking lever 3 can be pivoted in a mechanically-driven manner around the axis 8 in the direction of the arrow P4. However, it is also conceivable that, for example, an extension be formed on the blocking lever 3, which extension can be manually achieved and actuated after the engagement position E of the blocking lever 3 has been achieved. In any case, an additional actuation is necessary in order to move the blocking lever 3 out of the engagement region with the lock strike. As a result of the safety means, i.e., the blocking lever 3, the locking mechanism can thus be unlocked in the event of a power failure, and the motor vehicle lock 1 can thus be opened, wherein, at the same time, a safety means as blocking lever 3 prevents complete opening of the motor vehicle door, for example.

LIST OF REFERENCE SIGNS

1 Motor vehicle lock
2 Locking mechanism
3 Blocking lever
4 Lock case
5 Lock strike
6 Rotary latch
7 Rotary latch buffer
8 Axis
9 Hook-shaped end
10 Opening
11 Predetermined breaking point
E Engagement position
F Release position
P, P2, P3, P4 Arrow

The invention claimed is:

1. A motor vehicle lock comprising:

a locking mechanism with a rotary latch and a pawl, wherein a rotary movement of the rotary latch is locked by the pawl, an electric drive device that transfers the pawl from a locking position into a release position for the locking mechanism, an opening device, wherein a vehicle part interacting with the motor vehicle lock is moved by the opening device from a closed position into an open position, a safety lever, wherein the safety lever holds the vehicle part in the event of a power failure to the electric drive, and a lock strike, wherein the safety lever is spring-biased toward engagement with the lock strike, wherein the safety lever is held in a release position separated from the lock strike during the locking mechanism moving from a locking position of the locking mechanism to a release position of the locking mechanism during normal operation, and wherein the safety lever is released from the release position of the safety lever in the event of a power failure of the motor vehicle lock and the safety lever is biased into engagement with the lock strike.

2. The motor vehicle lock according to claim 1, wherein the safety lever comprises a rotatably-mounted blocking lever.

3. The motor vehicle lock according to claim 2, wherein the blocking lever is pivotably received on an axis of the rotary latch of the locking mechanism.

4. The motor vehicle lock according to claim 2, further comprising a lock strike, wherein the blocking lever is form-fittingly connected to the lock strike.

5. The motor vehicle lock according to claim 4, wherein the blocking lever is released from engagement with the lock strike by an internal door handle.

6. The motor vehicle lock according to claim 4, wherein the blocking lever is released from engagement with the lock strike by a release lever.

7. The motor vehicle lock according to claim 4, wherein the blocking lever has a hook shaped end for encompassing the lock strike.

8. The motor vehicle lock according to claim 4, wherein the blocking lever is latched in the lock strike.

9. The motor vehicle lock according to claim 4, wherein the lock strike is configured as a bracket, and both the rotary latch and the blocking lever engage with the lock strike bracket.

10. The motor vehicle lock according to claim 2, wherein the blocking lever has a hook shaped end for encompassing the lock strike, and wherein the blocking lever has a predetermined breaking point at the hook shaped end where the blocking lever is breakable to release engagement with the vehicle part.

11. The motor vehicle lock according to claim 2, further comprising a spring element, wherein the blocking lever is released from the vehicle part by a latching force being exceeded, and wherein the latching force is introduced into the blocking lever by the spring element.

12. The motor vehicle lock according to claim 2, wherein the blocking lever includes a metal material and at least a portion of the blocking lever includes a plastic cover.

* * * * *